United States Patent
Baudisch et al.

(10) Patent No.: US 8,850,696 B2
(45) Date of Patent: Oct. 7, 2014

(54) ROBOT TOOL

(75) Inventors: Matthias Baudisch, Bietigheim-Bissingen (DE); Joerg Zietemann, Waiblingen (DE)

(73) Assignee: Dr. Ing. H.C.F. Porsche Aktiengesellschaft, Stuttgart (DE)

( * ) Notice: Subject to any disclaimer, the term of this patent is extended or adjusted under 35 U.S.C. 154(b) by 907 days.

(21) Appl. No.: 13/009,954

(22) Filed: Jan. 20, 2011

(65) Prior Publication Data

US 2011/0182708 A1    Jul. 28, 2011

(30) Foreign Application Priority Data

Jan. 27, 2010    (DE) .......................... 10 2010 005 798

(51) Int. Cl.
 *B23Q 7/10* (2006.01)
 *B25J 15/06* (2006.01)
 *B25J 15/00* (2006.01)

(52) U.S. Cl.
 CPC .......... *B25J 15/0019* (2013.01); *B25J 15/0616* (2013.01)
 USPC .............. 29/809; 414/737; 414/815; 29/718; 29/790

(58) Field of Classification Search
 CPC ..... B25J 15/06; B25J 15/0226; B23P 19/006; B23P 19/042; B23P 19/007
 USPC .............................. 414/737, 815; 29/790, 718
 See application file for complete search history.

(56) References Cited

U.S. PATENT DOCUMENTS

| | | | | |
|---|---|---|---|---|
| 4,887,341 | A | * | 12/1989 | Sakimori et al. ........... 29/888.01 |
| 5,052,096 | A | * | 10/1991 | Fuller et al. ...................... 29/451 |
| 5,203,051 | A | * | 4/1993 | Tonami et al. ................... 16/2.1 |
| 5,488,767 | A | * | 2/1996 | Franovick ........................ 29/786 |
| 6,026,552 | A | * | 2/2000 | Matsumoto ................. 29/407.04 |
| 6,481,083 | B1 | * | 11/2002 | Lawson et al. ............. 29/407.04 |
| 7,371,303 | B2 | | 5/2008 | Schmitt |
| 7,578,052 | B2 | * | 8/2009 | Mondrusov et al. ............ 29/714 |
| 2008/0247844 | A1 | * | 10/2008 | Hartrampf et al. ................. 414/4 |
| 2008/0301923 | A1 | * | 12/2008 | Mondrusov et al. .......... 29/213.1 |

FOREIGN PATENT DOCUMENTS

| | | |
|---|---|---|
| DE | 10 2004 052 740 | 5/2006 |
| JP | 1125189 | 8/1989 |
| WO | 2005/095045 | 10/2005 |

* cited by examiner

*Primary Examiner* — David Bryant
*Assistant Examiner* — Ruth G Hidalgo-Hernande
(74) *Attorney, Agent, or Firm* — Gerald E. Hespos; Michael J. Porco; Matthew T. Hespos

(57) ABSTRACT

A robot tool for setting plugs (18) in industrial production has a robot attachment region (2) for attaching the robot tool (1) to an industrial robot. To further simplify or automate the setting of plugs in industrial production, in particular of motor vehicles, the robot tool (1) has a pushrod (42) that can be moved back and forth and with which a plug (18) can be picked up and advanced.

10 Claims, 4 Drawing Sheets

ROBOT TOOL

CROSS-REFERENCE TO RELATED APPLICATION

This application claims priority under 35 USC 119 to German Patent Application No. 10 2010 005 798.3, filed on Jan. 27, 2010, the entire disclosure of which is incorporated herein by reference.

BACKGROUND OF THE INVENTION

1. Field of the Invention

The invention relates to a robot tool for setting plugs in industrial production. The robot tool has a robot attachment region for attaching the robot tool to an industrial robot.

2. Description of the Related Art

Industrial robots are used in industrial production with grippers and various tools. An industrial robot requires six movement axes to allow a body to be turned and moved spatially in any way desired. Vertical buckling-arm robots also are referred to as jointed robots because of their type of construction. The universal handling and processing capabilities of the jointed robots also have led to the term universal robots.

The object of the invention is to further simplify or automate the setting of plugs in industrial production, in particular of motor vehicles.

SUMMARY OF THE INVENTION

A robot tool for setting plugs in industrial production has a robot attachment region for attaching the robot tool to an industrial robot. The robot tool has a pushrod that can be moved back and forth and with which a plug can be picked up and advanced. The industrial robot preferably is a vertical buckling-arm robot with six axes. In a paint shop for motor vehicles, for example, around one hundred plugs are manually set per vehicle. The robot tool according to the invention allows the setting of plugs to be automated in a simple manner.

A vacuum feed preferably is integrated in the pushrod of the robot tool. The vacuum feed is configured and disposed to apply a vacuum at a free end of the pushrod to hold a plug on the free end of the pushrod. The vacuum feed makes it possible to pick up a plug with the pushrod when the free end of the pushrod is positioned on or near the plug. The vacuum applied at the free end of the pushrod also enables the picked-up plug to be held securely on the free end of the pushrod during a movement of the industrial robot for advancing the plug.

An advancing cylinder preferably is provided so that the pushrod can be extended and retracted. The advancing cylinder is preferably a linear cylinder.

A pivoting holder of a pivoting unit preferably is attached to at least one of the pushrod and the advancing cylinder of the robot tool preferably so that the pushrod can be pivoted between a plug picking-up position and a plug mounting position. The pushrod may be arranged near a store of multiple plugs in the plug picking-up position so that one of the plugs can be picked up in a simple manner by applying a vacuum at the free end of the pushrod. The picked-up plug can be mounted in a simple manner in the plug mounting position by extending the pushrod.

The pivoting holder preferably can be pivoted by 180 degrees between the plug picking-up position and the plug mounting position. If need be, the pivoting holder can assume intermediate positions, for example at 90 degrees or at 45 degrees.

The pushrod of the robot tool preferably can be positioned with the aid of the pivoting unit near a plug magazine at the plug picking-up position. The plug magazine may be fastened to the industrial robot and keeps a store of multiple identical or different plugs. The pivoting unit and the pushrod enable the plugs to be removed individually in a simple manner. There is no longer any need for the robot to move to a separate storage station.

The plug magazine of the robot tool preferably is configured as a turret magazine that stores different plugs. The plugs can be picked up individually with the pushrod, according to requirements. The turret magazine may comprise a rotatable receiving device with multiple stacks. Each stack contains a store of one type of plug. The receiving device is turned to position the desired storage stack near, preferably below, the pushrod. Thus, a desired plug can be picked up easily by applying a vacuum at the free end of the pushrod.

The plug magazine of the robot tool preferably is configured as a tubular magazine with multiple plugs that can be picked up individually by the pushrod according to requirements. The tubular magazine preferably contains multiple identical plugs. A spring or similar biasing device preferably prestresses or biases the plugs in the tubular magazine against a removal opening.

At is at least one locking cylinder with a locking element preferably is provided in the tubular magazine of the robot tool. The locking element can be moved back and forth to enable individual plugs to be removed from the tubular magazine with the aid of the pushrod. The locking element functions to close a removal opening in the removal region of the tubular magazine and specifically exposes the removal opening for removal of a plug when the pivoting holder is arranged with the pushrod in the plug picking-up position. Two locking cylinders may be arranged in the removal region of the tubular magazine to simplify the individual removal of plugs. Each locking cylinder preferably is a linear cylinder.

A pivoting axis of the pivoting unit of the robot tool preferably is arranged midway between and transversely to a longitudinal axis of the tubular magazine and an advancing movement axis of the pushrod. The longitudinal axis of the tubular magazine and the advancing movement axis of the pushrod preferably are arranged in one plane, in relation to which the pivoting movement axis is perpendicular.

Further advantages, features and details of the invention emerge from the following description, in which an exemplary embodiment is described in detail.

DETAILED DESCRIPTION OF THE PREFERRED EMBODIMENT

Figure 1:
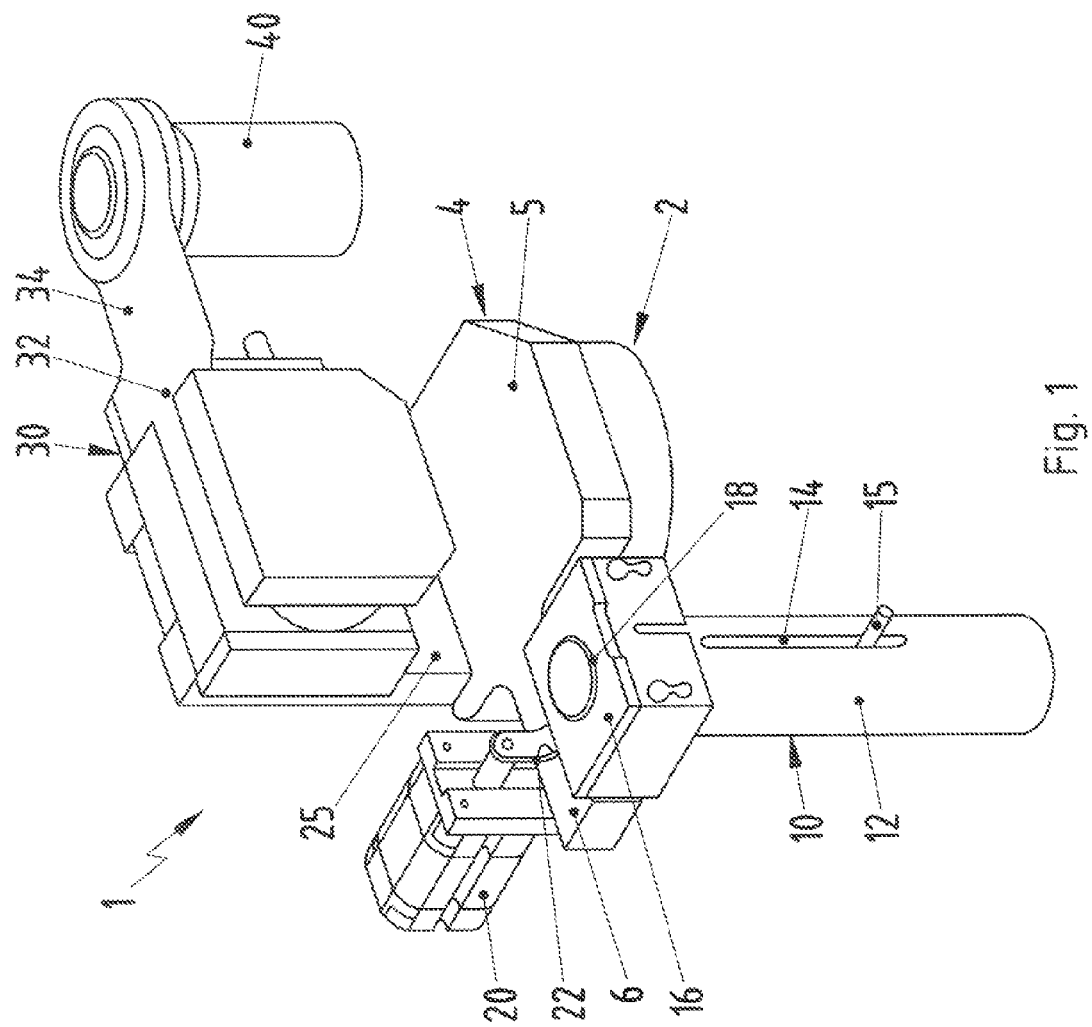
FIG. 1 is a perspective view of a robot tool according to the invention.
Figure 2:
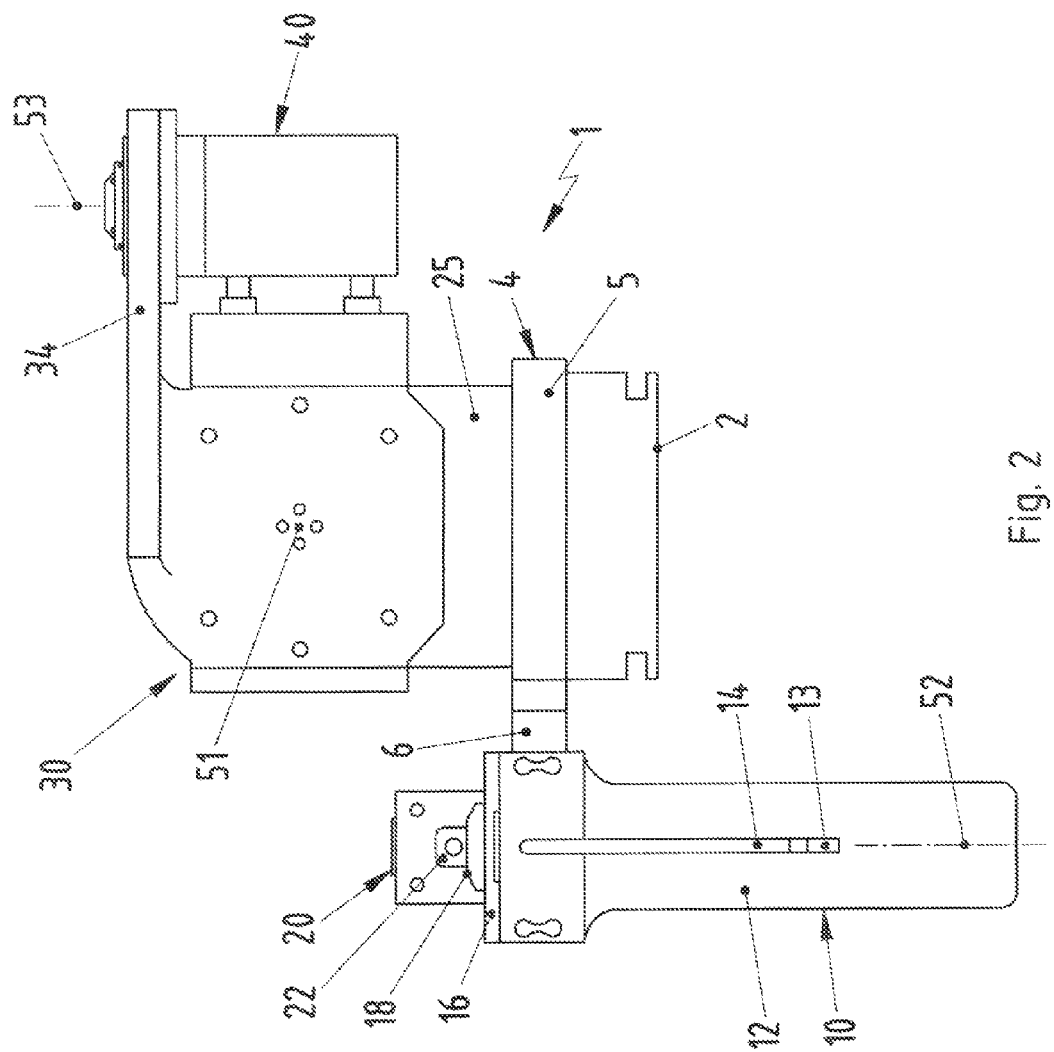
FIG. 2 is a front elevational view the robot tool of FIG. 1.
Figure 3:
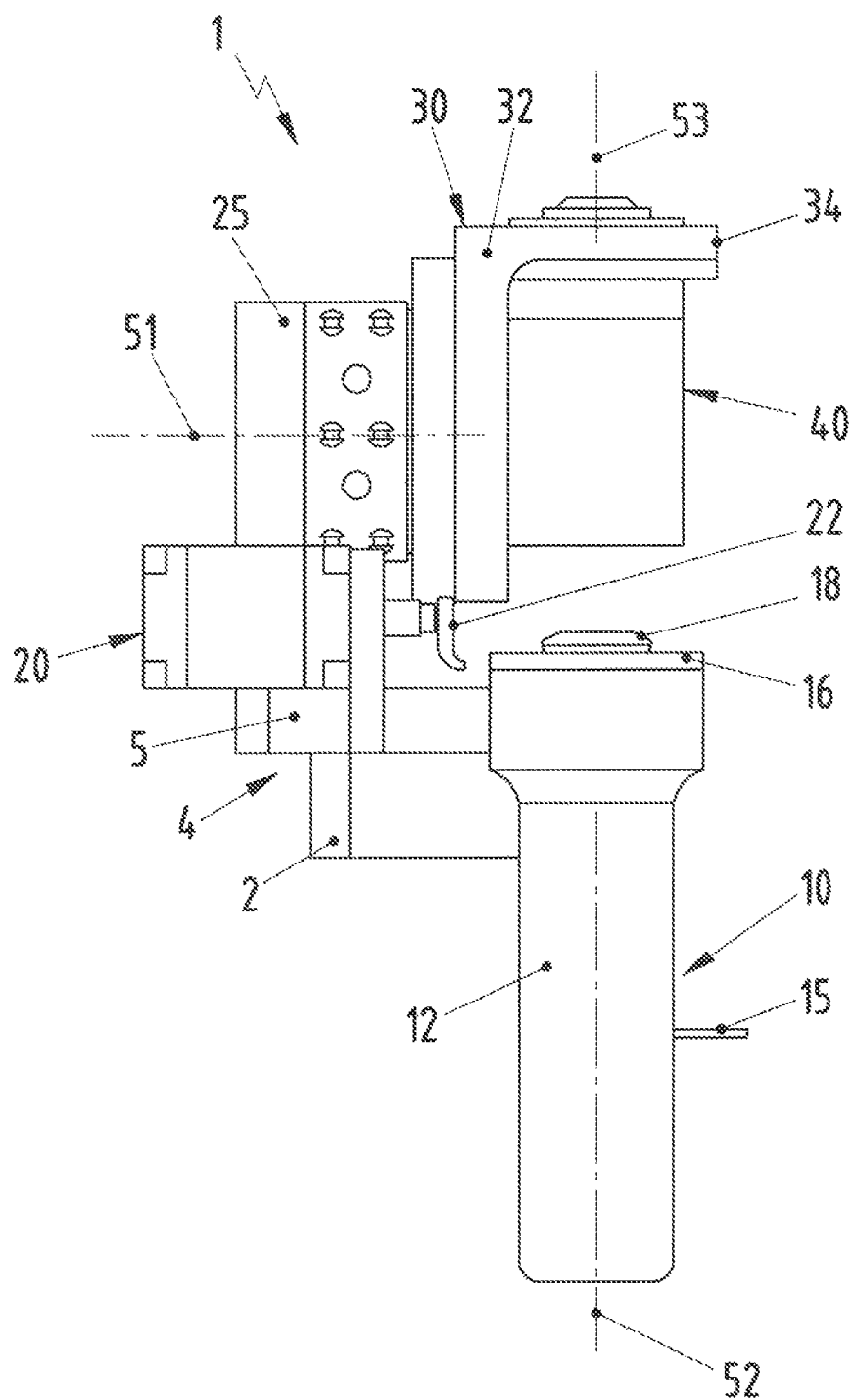
FIG. 3 is a side elevational view of the robot tool of FIGS. 1 and 2.

A robot tool in accordance with the invention is identified by the numeral 1 in FIGS. 1 to 3. The robot tool 1 has a robot attachment region 2, that enables the robot tool 1 to be attached to a fixed half of an industrial robot. The robot tool 1 is also referred to as the unfixed half of the industrial robot, because the robot tool 1 can be exchanged in a simple manner for another robot tool, for example an interchangeable nozzle head that has various lances for applying a wax in cavities of a motor vehicle.

Cavities in certain regions of the motor vehicle are filled with wax during the industrial production of motor vehicles to seal the cavities. The wax is applied through holes that are closed with the aid of plugs after the wax has been introduced into the cavities.

For example, after applying the wax with the aid of the interchangeable nozzle head, the robot tool 1 of the invention is exchanged in place of the interchangeable nozzle head. For this purpose, the robot tool 1 is attached with the robot attachment region 2 to the industrial robot. The plugs then can be mounted automatically on the motor vehicle in a simple manner with the aid of the industrial robot, according to requirements, for example, to close the holes from the cavity sealing.

The robot tool 1 comprises a carrying device 4 with a base plate 5, from which an extension 6 extends. Attached to the extension 6 of the carrying device 4 is a tubular magazine 10. A turret magazine, which comprises a rotatable holder for multiple stacks with different plugs, may alternatively or additionally be attached to the carrying device 4. In comparison with the turret magazine, the tubular magazine 10 preferably contains only plugs of one type.

The tubular magazine 10 comprises a receiving tube 12, which is closed at one end. In the receiving tube 12, a spring 13 is prestressed against a stack of plugs of an identical type. The receiving tube 12 has an elongate slit 14 and a pin 15 protrudes out perpendicularly through the slit 14. The pin 15 is externally visible to indicate the filling level of the plugs in the receiving tube 12. The pin 15 alternatively or additionally serves for pressing down or compressing the spring 13 when a stack of plugs is placed into the receiving tube 12.

The end of the receiving tube 12 remote from the closed end of the tubular magazine 10 defines a removal opening that is closed by a cover 16. A plug 18 is arranged in the removal opening and is ready to be removed. The removal of an individual plug 18 from the tubular magazine 10 is made possible by a locking cylinder 20, which is configured as a linear cylinder and comprises a locking element 22.

The locking element 22 can be moved back and forth with the aid of the locking cylinder 20 in such a way that the removal of the individual plug 18 is made possible in a simple manner. A second locking cylinder with a second locking element may also be arranged in the removal region of the tubular magazine 10 to further simplify or improve the individual removal of the plugs from the tubular magazine 10.

The carrying device 4 further comprises a carrying wall 25 that extends perpendicularly to the base plate 5. A pivoting unit 30 is fastened to the carrying wall 25 and comprises a pivoting holder 32 from which a pivoting arm 34 extends. An advancing cylinder 40, which is configured as a linear cylinder, is fastened to the free end of the pivoting arm 34.

Figure 4:
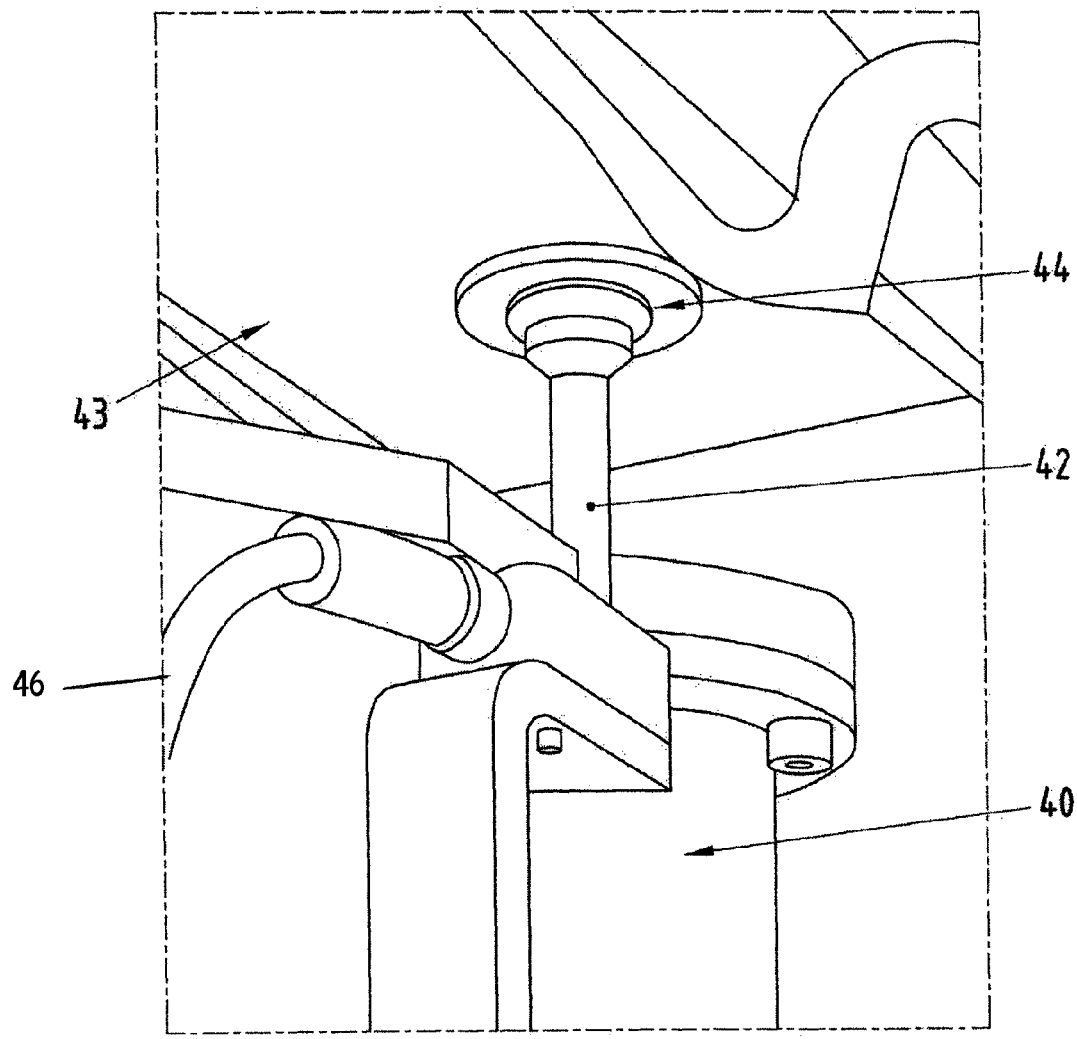
FIG. 4 is an enlarged detail of the robot tool of FIGS. 1 to 3, with an extended pushrod.

As shown in FIG. 4 the advancing cylinder 40 comprises a pushrod 42, that can be extended out of the advancing cylinder 40 to mount a plug on a sill 43 of a motor vehicle. A vacuum feed 46 extends to the advancing cylinder 40 and is integrated in the pushrod 42 for selectively applying a vacuum at a free end 44 of the pushrod. Applying the vacuum allows a plug to be held securely on the free end 44 of the pushrod 42 in a simple manner.

The pivoting holder 32 of the pivoting unit 30 can be pivoted about a pivoting axis 51, as shown in FIGS. 2 and 3, to pivot the advancing cylinder 40 with the pushrod 42 by 180 degrees out of its plug mounting position represented in FIGS. 1 to 4. The pivoting by 180 degrees has the effect of positioning the advancing cylinder 40 with the pushrod 42 above the cover 16 of the tubular magazine 10 so that the free end 44 of the pushrod 42 is arranged above the plug 18. The plug 18 then can be removed in a simple manner from the tubular magazine 10 by applying a vacuum at the free end 44 of the pushrod 42.

The pivoting holder 32 of the pivoting unit 30 and the advancing cylinder 40 can be pivoted again while the plug 18 is held on the free end of the pushrod 42 to bring the pivoting holder 32 again into the plug mounting position. The plug 18 then can be mounted by extending the pushrod 42, as can be seen in FIG. 4. The vacuum feed through the pushrod 42 can be switched off after mounting and the pushrod 42 can be retracted into the cylinder 40.

The longitudinal axis of the tubular magazine 10 is denoted by 52 in FIGS. 2 and 3 and the advancing axis of the advancing cylinder 40 is denoted by 53. In FIG. 2 it can be seen that the pivoting axis 51 of the pivoting unit 30 extends perpendicularly to the plane of the drawing in FIG. 2 and perpendicularly to the axes 52 and 53. At the same time, the pivoting axis 51 is arranged midway between the two axes 52 and 53 when the pivoting holder 32 is in the plug advancing position.

FIG. 3 shows that the longitudinal axis 52 of the tubular magazine 10 is arranged in a common plane with the advancing axis 53 of the advancing cylinder 40. The cylinders 20, 40 used in the robot tool 1 preferably are pneumatic reciprocating cylinders. The pivoting unit 30 preferably is a pneumatic rotating module.

The robot tool 1 according to the invention provides a simple tool by which plug setting can be carried out automatically, quickly and easily with relatively few movements. New plugs can be preloaded in the magazine in non-productive times, for example by a stack of ten plugs being pressed into the tubular magazine 10. The individual plugs can then be removed from the tubular magazine 10 and set with the aid of the pivoting unit 30 in a time-saving manner when the industrial robot is moving between two mounting positions.

What is claimed is:

1. A robot tool for setting plugs in industrial production, the robot tool comprising: a robot attachment region for attaching the robot tool to an industrial robot; and a pushrod that can be moved back and forth and with which a plug can be picked up and advanced, a vacuum feed integrated in the pushrod, a vacuum being applied selectively at a free end of the pushrod to hold a plug on the free end of the pushrod, an advancing cylinder, the pushrod being slidably engaged in the advancing cylinder for selective extension and retraction from and into the advancing cylinder, the advancing cylinder being attached pivotably to a pivoting holder of a pivoting unit so that the pushrod can be pivoted between a plug picking-up position and a plug mounting position.

2. The robot tool of claim 1, wherein the pivoting holder is pivotable approximately 180 degrees between the plug picking-up position and the plug mounting position.

3. The robot tool of claim 1, further comprising a plug magazine fastened to the industrial robot, a first end of the plug magazine being at the plug picking-up position, the pivoting unit selectively positioning the free end of the pushrod substantially in alignment with the first end of the plug magazine and at the plug picking-up position.

4. The robot tool of claim 3, wherein the plug magazine is a turret magazine with a plurality of plug supplies for supplying different types of plugs that can be individually picked up with the pushrod, according to requirements.

5. The robot tool of claim 3, wherein the plug magazine is a tubular magazine for storing multiple plugs that can be picked up sequentially by the pushrod.

6. The robot tool of claim 5, further comprising at least one locking cylinder arranged in a removal region of the tubular magazine, the locking cylinder having a locking element that can be moved back and forth to enable the pushrod to remove individual plugs from the tubular magazine.

7. The robot tool of claim 5, wherein the pivoting unit has a pivoting axis arranged midway between and transversely to a longitudinal axis of the tubular magazine and an advancing movement axis of the pushrod when the pivoting holder is at the plug mounting position.

8. A robot tool for setting plugs in a body of a vehicle, the robot tool comprising:
- a robot attachment region for attaching the robot tool to an industrial robot;
- at least one tubular magazine attached to the robot attachment region for storing a stack of the plugs along an axis;
- a pivoting arm mounted on the robot attachment region and pivotable about a pivot axis spaced from and substantially orthogonal to the axis of the stack of the plugs;
- a pushrod cylinder mounted to an end of the pivoting arm spaced from the pivoting axis and a pushrod mounted in the pushrod cylinder for movement along an axis of the pushrod cylinder that is spaced from and substantially orthogonal to the pivot axis of the pivoting arm, a vacuum feed integrated in the pushrod for applying a vacuum at a free end of the pushrod to hold a plug on the free end of the pushrod, the axes of the stack of the plugs and the pushrod cylinder being substantially equidistant from the pivoting axis of the pivoting arm so that pivoting of the pivoting arm about the pivoting axis can move the free end of the pushrod between a plug picking-up position where the free end of the pushrod can pick up a top plug in the stack and a plug mounting position where the free end of the pushrod is positioned to mount the plug in the vehicle.

9. The robot tool of claim 8, wherein the pivoting arm is pivotable approximately 180 degrees between the plug picking-up position and the plug mounting position.

10. The robot tool of claim 8, further comprising at least one locking cylinder arranged in a removal region of the tubular magazine, the locking cylinder having a locking element that can be moved back and forth to selectively enable the pushrod to remove a top plug from the tubular magazine.

* * * * *